(12) United States Patent
Kawakami et al.

(10) Patent No.: US 8,552,108 B2
(45) Date of Patent: Oct. 8, 2013

(54) ROOM TEMPERATURE CURABLE ORGANOPOLYSILOXANE COMPOSITION AND GAS SEPARATION MEMBRANE

(75) Inventors: Hiroyoshi Kawakami, Tokyo (JP); Shoichi Hasebe, Tokyo (JP); Tsuneo Kimura, Annaka (JP)

(73) Assignees: Tokyo Metropolitan University, Tokyo (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/452,056

(22) Filed: Apr. 20, 2012

(65) Prior Publication Data

US 2012/0270976 A1  Oct. 25, 2012

(30) Foreign Application Priority Data

Apr. 21, 2011  (JP) .................. 2011-094690

(51) Int. Cl.
*C08L 83/04* (2006.01)
*B32B 18/00* (2006.01)
*B32B 27/34* (2006.01)
*B32B 5/14* (2006.01)

(52) U.S. Cl.
USPC ........... 524/588; 428/403; 428/404; 428/405; 428/407; 525/477

(58) Field of Classification Search
None
See application file for complete search history.

(56) References Cited

U.S. PATENT DOCUMENTS

| | | | | |
|---|---|---|---|---|
| 6,136,917 A | * | 10/2000 | Christiano et al. | ............ 524/588 |
| 6,939,925 B2 | | 9/2005 | Sakamoto et al. | |
| 2009/0226623 A1 | | 9/2009 | Liu | |

FOREIGN PATENT DOCUMENTS

| | | |
|---|---|---|
| JP | 2004-143331 A | 5/2004 |
| JP | 2007-99607 A | 4/2007 |
| JP | 2010-222228 A | 10/2010 |

OTHER PUBLICATIONS

"Facile Preparation and Characterization of Hyperbranched Poly(amine ester) Grafted Silica Nanoparticles" authored by Liu et al. and published in the Journal of Materials Science (2004) 39, 3825-3827.*
"Well-Defined Dendritic-Grat Copolymer Grafted Silica Nanoparticle by Consecutive Surface-Initiated Atom Transfer Radical Polymerizations" authored by Mu et al. and published in Industrial and Engineering Chemistry Research (2007) 46, 3069-3072.*
European Search Report dated Jul. 26, 2012 of European Application No. 12 16 4881.
Takahashi, et al., "Gas Permeation in Poly(Ether Imide) Nanocomposite Membranes Based on Surface-Treated Silica. Part 2: With Chemical Coupling to Matrix", Polymer 2006, 47, p. 7535-7547.

* cited by examiner

*Primary Examiner* — Marc Zimmer
(74) *Attorney, Agent, or Firm* — Birch, Stewart, Kolasch & Birch, LLP (57) ABSTRACT

A room temperature curable organopolysiloxane composition is provided. The composition comprises (I) an organopolysiloxane which is a condensation product of component (A) (an organopolysiloxane comprising $R_3SiO_{1/2}$ unit and $SiO_{4/2}$ unit and containing 0.02 to 0.12 mol/100 g of hydroxy group bonded to the silicon atom) and component (B) (a diorganopolysiloxane raw rubber having hydroxy group on opposite ends thereof), (II) an organosilane compound having at least 2 hydrolyzable groups bonded to the silicon atom on average per molecule, and/or its partial hydrolytic condensate, (III) a solvent, and (IV) a silica nano particle having its surface modified by a branch structure. The composition is capable of providing a high strength film without incorporating reinforcement fillers, with no curing inhibition by the inorganic nano particles, and without inhibiting gas separation performance realized by the inorganic nano particles.

8 Claims, 1 Drawing Sheet

ROOM TEMPERATURE CURABLE ORGANOPOLYSILOXANE COMPOSITION AND GAS SEPARATION MEMBRANE

CROSS-REFERENCE TO RELATED APPLICATION

This non-provisional application claims priority under 35 U.S.C. §119(a) on Patent Application No. 2011-094690 filed in Japan on Apr. 21, 2011, the entire contents of which are hereby incorporated by reference.

TECHNICAL FIELD

This invention relates to a room temperature curable organopolysiloxane composition capable of producing a membrane having high gas separation performance, and a gas separation membrane produced by curing such composition.

BACKGROUND ART

Studies on fine particles (nano particle) of nanometer order with the average particle diameter of about 1 nm to several hundred nm are recently active as a part of nanotechnology studies. In contrast to conventional bulk materials, nano particles prepared by using nano-size materials has been found to be capable of expressing and being imparted with various functions and properties, and their application in a wide variety of industrial fields are highly anticipated.

Nano particles can be produced as primary particles. However, the primary particles tend to be aggregated due to their fine particle size, and when left without further processing, these primary particles form aggregates with the particle size of micrometer order. For example, when the inorganic nano particle as described above are added to an organic component, improvement in the heat resistance and mechanical strength can be anticipated. However, the inorganic particle with no further processing may form aggregates of micrometer order in the polymer matrix due to the strong aggregability, and as a consequence, the properties and performance anticipated for the organic-inorganic hybrid material may not be realized. Accordingly, maintenance of the primary particle dispersibility by uniform chemical modification of the particle surface has been proposed (for example, see JP-A 2007-99607).

In addition, organic-inorganic hybrid materials have become a focus of attention since they are capable of synergetically realize the merits of both the inorganic component and the organic component by mixing these components at nano level or molecular level. This concept has been applied to polymer gas separation membranes whose role is highly anticipated in solving energy and environmental problems. More specifically, realization of high mechanical strength, thermal stability, and gas permeability which could not be realized by conventional method by preparing an organic-inorganic hybrid material having inorganic nano particles dispersed in a polymer matrix is highly awaited.

Gas separation using the gas permeating property of a polymer membrane has characteristic features such as separation and recovery of the gas without phase change of the gas, relative simplicity of the procedure compared with other gas separation methods with the possibility of reducing the system size, and reduced environmental stress due to the possibility of continuous gas separation. Such energy-saving gas separation method using a polymer gas separation membrane has attracted attention as a technology for use in the separation and recovery of greenhouse gas, preparation of oxygen-rich air, and natural gas purification and progress toward the commercialization is highly awaited. However, this technology needs further improvement in the gas separation performance as well as gas permeation rate.

As described above, attempts have been made to improve the gas permeability by incorporating inorganic nano particles in the polymer membrane. However, the problem of nano particle aggregation is also a problem in the preparation of an organic-inorganic hybrid gas separation membrane. In previous organic-inorganic hybrid gas separation membranes, aggregation of the inorganic nano particles in the polymer matrix resulted in the loss of membrane strength or limitation of the particle content, and as a consequence, the gas permeability could be improved only by several folds.

In an exemplary method of improving the gas separation membrane properties by inclusion of inorganic nano particles in a polymer membrane, the surface of the silica nano particles is treated by an amino group-containing silane coupling agent for silylation and the silylated particles are treated by a polymer to produce polymer-grafted silica particles. The resulting polymer-grafted silica particles are then distributed in the polymer for the preparation of a resin film. This resin film was evaluated for the performance as a gas separation membrane. (See Polymer, 47 (2006), pp. 7535-7547.) However, the results including the gas permeation rate were insufficient.

The inventors of the present invention have found that a gas separation membrane having improved excellent uniform dispersibility and markedly improved gas permeation rate by binding a bulky hyperbranched polymer or a dendrimer polymer to the surface of inorganic nano particles (see JP-A 2010-222228).

A matrix resin is required in the production of a gas permeation membrane. Exemplary matrix resins used include various resins such as polyimide, polysulfone, polydimethylsiloxane, poly-substituted acetylene, poly-4-methyl pentene-1, and natural rubber. However, polyimide resins having excellent strength, durability, and heat resistance are inferior in the gas permeability while polydimethylsiloxanes having excellent gas permeability are generally inferior in the strength compared to organic rubbers and resins. Accordingly, there has been no material which is convenient for use as a matrix resin.

The inventors of the present invention proposed a condensation curable coating composition based on a condensate of an organosiloxane comprising $R_3SiO_{1/2}$ unit (wherein R is independently a substituted or unsubstituted monovalent hydrocarbon group having 1 to 6 carbon atoms) and $SiO_{4/2}$ unit with a straight chain diorganopolysiloxane having opposite ends of its molecular chain capped with hydroxy group in JP-A 2004-143331). Although this composition is capable of providing a cured film with high strength without using a reinforcement filler, this composition has been developed as an electric or electronic coating agent or an antifouling coating agent, and this patent application is utterly silent about its use as a matrix component for particles having a particular function such as separation membrane.

SUMMARY OF THE INVENTION

The present invention has been completed based on the situation as described above, and an object of the present invention is to provide a room temperature curable organopolysiloxane composition capable of producing a membrane having high gas separation performance, and a gas separation membrane produced by curing such composition.

When used alone, the silicone rubber having a backbone of polydimethylsiloxane is inferior in the strength of the cured product compared to ordinary organic rubbers and resins due to the weak interaction between the polymers. Incorporation of a reinforcement filler such as reinforcement silica is necessary for the improvement of the strength. However, addition of such reinforcement filler results in the increase of viscosity of the composition which leads to the difficulty in forming the gas separation membrane. Accordingly, when the silicone rubber composition having a reinforcement filler incorporated therein is applied to the present invention, content of the inorganic nano particle having the bulky hyperbranched polymer or dendrimer bonded to its surface will be limited, and use of such silicone rubber is inadequate for the matrix component of the gas separation membrane of the present invention.

An addition curable silicone rubber composition prepared by using a diorganopolysiloxane polymer having vinyl group at opposite ends, an organosiloxane comprising vinyldimethylsiloxy unit and $SiO_{4/2}$ unit, an organopolysiloxane having hydrosilyl group (cross linking agent), and a platinum group catalyst (catalyst) is capable forming a film with high strength without incorporating the reinforcement filler. However, in the case of the present invention, a compound having amino group is used for the surface modification of the inorganic nano particle, and therefore, such compound having amino group is inadequate for use as the matrix component of the gas separation membrane of the present invention since such compound tends to be poisoned by the platinum group catalyst, leading to failure of the curing.

The inventors of the present invention conducted an intensive study on the matrix resin and found that use of a hybrid of an inorganic nano particle of the present invention with a particular condensation curable polydimethylsiloxane resin provides an excellent gas separation membrane exhibiting improved gas separation performance and mechanical strength which also exhibits durability and heat resistance inherent to the polydimethylsiloxane, and the present invention has been completed on the bases of such finding.

Accordingly, the present invention provides a room temperature curable organopolysiloxane composition and a gas separation membrane as described below.

[1] A room temperature curable organopolysiloxane composition comprising (I) 100 parts by weight of an organopolysiloxane which is a condensation product of 80 to 20 parts by weight of the following component (A) and 20 to 80 parts by weight of the following component (B) (with the proviso that total of the components (A) and (B) are 100 parts by weight):

(A) an organopolysiloxane comprising $R_3SiO_{1/2}$ unit (wherein R independently represents a substituted or unsubstituted monovalent hydrocarbon group containing 1 to 6 carbon atoms) and $SiO_{4/2}$ unit, with the $R_3SiO_{1/2}$ unit being present at 0.6 to 1.2 mol per mole of the $SiO_{4/2}$ unit; optionally further comprising $R_2SiO_{2/2}$ unit and $RSiO_{3/2}$ unit (wherein R is as defined above) respectively at 0 to 1.0 mol per mole of the $SiO_{4/2}$ unit, and containing 0.02 to 0.12 mol/100 g of hydroxy group bonded to the silicon atom, and (B) a diorganopolysiloxane raw rubber having hydroxy group on opposite ends thereof and having a degree of polymerization of at least 5,000, (II) 10 to 50 parts by weight of an organosilane compound having at least 2 hydrolyzable groups bonded to the silicon atom on average per molecule, and/or its partial hydrolytic condensate, (III) 500 to 1,500 parts by weight of a solvent, and (IV) 10 to 150 parts by weight of silica nano particles having their surface modified by a branch structure.

[2] A composition according to the above [1] wherein the component (B) is a straight chain diorganopolysiloxane represented by the following formula (1):

$$HO—(R^1{}_2SiO)_n—H \quad (1)$$

wherein $R^1$ is independently a substituted or unsubstituted monovalent hydrocarbon group containing 1 to 10 carbon atoms and n is an integer of at least 5,000.

[3] A composition according to the above [1] or [2] wherein the component (II) is an organosilane compound having 2 hydrolyzable groups bonded to the silicon atom on average per molecule represented by the following formula (2):

$$R^2{}_aSiX_{4-a} \quad (2)$$

wherein $R^2$ is a substituted or unsubstituted monovalent hydrocarbon group, x is a hydrolyzable group, and a is 0, 1, or 2, and/or its partial hydrolytic condensate.

[4] A composition according to the above [3] wherein $R^2$ in the component (II) is vinyl group.

[5] A composition according to any one of the above [1] to [4] wherein the component (IV) is the one produced by treating surface of a silica nano particle with a compound having amino group at its end and represented by the following formula (3):

(wherein $R^5$ represents methyl group or ethyl group, $R^6$ represents an alkylene group containing 1 to 5 carbon atoms and optionally having an intervening —NH— group) to modify the silica nano particle surface with the amino group, and then reacting a hyperbranched monomer represented by the following formula (4):

(wherein $R^7$ represents a trivalent saturated aliphatic group or an aromatic group) with the amino group-modified silica nano particles.

[6] A composition according to any one of the above [1] to [5] further comprising (V) 0.1 to 5 parts by weight of a condensation catalyst.

[7] A composition according to the above [6] wherein the condensation catalyst (V) is an aminosilane coupling agent represented by the following formula (5):

$$H_2N—(CH_2)_b—SiR^8{}_c(OR^9)_{3-c} \quad (5)$$

wherein $R^8$ is a monovalent hydrocarbon group containing 1 to 6 carbon atoms, $R^9$ is methyl group or ethyl group, b is an integer of 1 to 3, and c is 0 or 1.

[8] A gas separation membrane produced by curing the composition of any one of the above [1] to [7].

ADVANTAGEOUS EFFECTS OF THE INVENTION

The present invention provides a room temperature curable organopolysiloxane composition which is free from curing inhibition due to the use of the condensation curable polydimethylsiloxane composition for the matrix resin; which does not inhibit the gas separation performance realized by the inorganic nano particles since the gas permeability of the matrix resin comprising an organopolysiloxane is relatively higher than the ordinary organic rubbers and resins; which is not affected by the upper limit of the inorganic nano particle content due to the use of the particular condensation curable organopolysiloxane which is capable of providing a high strength film without incorporating the reinforcement filler; and which can be readily produced into the gas separation membrane owing to the high strength. The present invention also provides a gas separation membrane produced by curing such composition.

DESCRIPTION OF THE PREFERRED EMBODIMENTS

Next, the present invention is described in detail.
Component (I)

The organopolysiloxane which is component (I) of the present invention is a base polymer (main component) of the composition of the present invention, and this component (I) is a condensation product of component (A) and component (B) as described below.

[Component (A)]

Component (A) is an organopolysiloxane comprising $R_3SiO_{1/2}$ unit (wherein R independently represents a substituted or unsubstituted monovalent hydrocarbon group containing 1 to 6 carbon atoms) and $SiO_{4/2}$ unit. The $R_3SiO_{1/2}$ unit is present at 0.6 to 1.2 mol per mole of the $SiO_{4/2}$ unit. The component (A) optionally further comprises $R_2SiO_{2/2}$ unit and $RSiO_{3/2}$ unit (wherein R is as defined above) respectively at 0 to 1.0 mol per mole of the $SiO_{4/2}$ unit, and component (A) contains 0.02 to 0.12 mol/100 g of hydroxy group bonded to the silicon atom.

Examples of R include alkyl groups such as methyl group, ethyl group, n-propyl group, isopropyl group, n-butyl group, isobutyl group, tert-butyl group, pentyl group, and hexyl group; cycloalkyl groups such as cyclopentyl group and cyclohexyl group; alkenyl groups such as vinyl group, allyl group, isopropenyl group, butenyl group, pentenyl group, and hexenyl group; aryl groups such as phenyl group; and halogenated alkyl groups such as chloromethyl group, 3-chloropropyl group, 1-chloro-2-methyl propyl group, and 3,3,3-trifluoropropyl group. Among these, the preferred are methyl group, vinyl group, and phenyl group, and the most preferred is methyl group.

The organopolysiloxane (component (A)) can be obtained by co-hydrolytic condensation of the alkoxy group-containing silane compounds corresponding to the units as described above in an organic solvent by a method known in the art. For example, $R_3SiOMe$ and $Si(OMe)_4$, and if desired, also $R_2Si(OMe)_2$ and/or $RSi(OMe)_3$ may be co-hydrolyzed for condensation in an organic solvent (In the above formula, R is independently as described above and Me is methyl group).

The organic solvent is a solvent which can dissolve the organopolysiloxane produced by co-hydrolytic condensation, and typical such solvents include toluene, xylene, and naphtha mineral spirit.

Molar ratio of the units of the component (A) may be controlled by adjusting the amount of the silane compound corresponding to each unit supplied to the reaction system.

In the component (A), amount of the $R_3SiO_{1/2}$ unit in mol in relation to 1 mol of the $SiO_{4/2}$ unit should be in the range of 0.6 to 1.2 mol, and preferably in the range of 0.65 to 1.15 mol. When the $R_3SiO_{1/2}$ unit is at an amount less than 0.6 mol, gelation occurs during the synthesis of the component (A), and production becomes difficult. On the other hand, amount in excess of 1.2 mol results in an insufficient strength of the composition of the present invention after curing. As described above, the component (A) may also contain $R_2SiO_{2/2}$ unit and $RSiO_{3/2}$ unit at an amount in the range of 0 to 1.0 mol, more preferably 0 to 0.7 mol, and more preferably 0 to 0.5 mol in relation to 1 mol of the $SiO_{4/2}$ unit. Amount of these units in excess of such range results in the loss of mechanical strength of the cured product.

Hydroxy group bonded to the silicon atom is generated in the preparation of the component (A) by co-hydrolytic condensation. Inclusion of this hydroxy group is necessary for the condensation with the component (B), content of the hydroxy group in the component (A) should be in the range of 0.02 to 0.12 mol/100 g, and most preferably 0.03 to 0.10 mol/100 g. The content of the hydroxy group may be controlled by adjusting the co-hydrolytic condensation conditions. The content in excess of 0.12 mol/100 g will result in unduly high hardness of the composition of the present invention after curing, and hence, loss of rubber elasticity. On the other hand, the content of less than 0.02 mol/100 g will result in the insufficient hardness of the composition of the present invention after curing.

The component (A) preferably has a molecular weight of about 2,000 to 10,000, and most preferably about 3,000 to 7,000. Excessively low molecular weight may result in an insufficient extension of the coating film, while excessively high molecular weight may result in gelation in the reaction with the component (B) and failure in obtaining the desired condensation product.

In the present invention, the molecular weight or the degree of polymerization may be measured as the weight average molecular weight (Mw) or the weight average degree of polymerization (Nw) in terms of polystyrene in the gel permeation chromatography (GPC) using toluene for the developing solvent.

[Component (B)]

The component (B) which is condensed with the component (A) is a diorganopolysiloxane raw rubber having hydroxy group at opposite ends [namely, having hydroxy diorganosiloxy group: $(HO)R^1_2SiO_{1/2}$ (wherein $R^1$ is independently a substituted or unsubstituted monovalent hydrocarbon group containing 1 to 10 carbon atoms) at opposite ends of the molecular chain] having a degree of polymerization of at least 5,000, and in particular, the straight chain diorganopolysiloxane represented by the following formula (1):

$$HO\!-\!(R^1_2SiO)_n\!-\!H \quad (1)$$

wherein $R^1$ is independently a substituted or unsubstituted monovalent hydrocarbon group containing 1 to 10 carbon atoms, and in particular, 1 to 6 carbon atoms, and n is an integer of at least 5,000.

Examples of the $R^1$ in the formula (1) include alkyl groups such as methyl group, ethyl group, n-propyl group, isopropyl group, n-butyl group, isobutyl group, tert-butyl group, pentyl group, hexyl group, heptyl group, octyl group, nonyl group, and decyl group; cycloalkyl groups such as cyclopentyl group and cyclohexyl group; alkenyl groups such as vinyl group, allyl group, isopropenyl group, butenyl group, pentenyl group, and hexenyl group; aryl groups such as phenyl group, tolyl group, xylyl group, and naphthyl group; aralkyl groups such as benzyl group, phenethyl group, phenyl and propyl group; halogenated alkyl groups such as chloromethyl group, 3-chloropropyl group, 1-chloro-2-methyl propyl group, and 3,3,3-trifluoropropyl group. Among these, the preferred is methyl group.

In the formula (1), n (degree of polymerization) is an integer of at least 5,000, preferably at least 5,000 to 200,000, more preferably at least 5,000 to 20,000, and most preferably at least 6,000 to 12,000. The degree of polymerization of less than 5,000 results in the loss of extension, and hence, failure of realizing the desired high strength, while the degree of polymerization in excess of 200,000 may result in the unduly high viscosity of the composition such that the composition is still unsuitable for the film formation after diluting with a solvent.

[Condensation of Component (A) and Component (B)]

The organopolysiloxane of component (I) can be produced by the condensation using 80 to 20 parts by weight of the component (A) (namely, 80 to 20% by weight in the total of the components (A) and (B)) with 20 to 80 parts by weight of the component (B) (namely, 20 to 80% by weight in the total of the components (A) and (B)). When the component (A) is used at less than 20% by weight, the composition of the present invention after the curing will not have rubber strength, while the use in excess of 80% by weight results in the decrease in the extension of the cured composition, and hence, loss of the rubber elasticity. More preferably, 70 to 30 parts by weight of the component (A) (70 to 30% by weight in the total of the components (A) and (B)) is used with 30 to 70 parts by weight of the component (B) (30 to 70% by weight in the total of the components (A) and (B)), and more preferably, 45 to 55 parts by weight of the component (A) (45 to 55% by weight in the total of the components (A) and (B)) is used with 55 to 45 parts by weight of the component (B) (55 to 45% by weight in the total of the components (A) and (B)).

The condensation of the component (A) and the component (B) is preferably promoted by using a condensation catalyst. Exemplary condensation catalysts include titanium compounds, tin compounds, amine compounds, and alkaline metal compounds, and the preferred are amine compounds such as ethylamine, propylamine, isopropylamine, butylamine, diethylamine, dibutylamine, triethylamine, and ammonia solution.

The condensation catalyst is not particularly limited as long as it is used at a catalytic amount. The condensation catalyst is typically used at about 0.5 to 3.0 parts by weight in relation to 100 parts by weight of the total of the component (A) and the component (B).

The condensation temperature is also not particularly limited, and typical temperature used is in the range of 1 to 120° C., and preferably 10 to 80° C. The reaction time is also not particularly limited and a reaction time of about 1 to 24 hours is sufficient.

If possible, the catalyst is preferably removed after the completion of the condensation reaction. In the case of ammonia solution, it can be distilled off by ester trapping using an azeotropically dehydratable solvent such as toluene. In the case of an organic amine, removal by heating at a reduced pressure is effective.

The resulting condensation product of the component (A) and the component (B) varies widely in its molecular weight, and therefore, determination of the condensation product by the weight average molecular weight (Mw) measured by GPC is difficult. Basically, the condensation product preferably has a structure such that the hydroxy group in the component (A) having a weight average molecular weight of 2,000 to 10,000 is condensed with the hydroxy group at opposite ends of the component (B) having a degree of polymerization of at least 5,000 (corresponding to a weight average molecular weight of at least 370,000).

Component (II)

The component (II) of the present invention functions as a crosslinking agent of the composition of the present invention, and it is an organosilane compound having on average at least 2, and preferably 3 or 4 hydrolyzable groups bonded to the silicon atom per molecule and/or its partial hydrolytic condensate (namely, an organopolysiloxane having on average at least 2 remaining hydrolyzable group per molecule). Exemplary component (II) is an organosilane compound having on average at least 2 hydrolyzable groups bonded to the silicon atom per molecule represented by the following formula (2):

$$R^2_a SiX_{4-a} \quad (2)$$

(wherein $R^2$ is a substituted or unsubstituted monovalent hydrocarbon group, X is a hydrolyzable group, and a is 0, 1, or 2, and preferably 0 or 1) and/or its partial hydrolytic condensate.

Examples of the $R^2$ in the formula (2) include those containing 1 to 10 carbon atoms, and in particular, 1 to 6 carbon atoms, for example, alkyl groups such as methyl group, ethyl group, n-propyl group, isopropyl group, n-butyl group, isobutyl group, tert-butyl group, pentyl group, hexyl group, heptyl group, octyl group, nonyl group, and decyl group; cycloalkyl groups such as cyclopentyl group and cyclohexyl group; alkenyl groups such as vinyl group, allyl group, isopropenyl group, butenyl group, pentenyl group, and hexenyl group; aryl groups such as phenyl group, tolyl group, xylyl group, and naphthyl group; aralkyl groups such as benzyl group, phenethyl group, and phenylpropyl group; and halogenated alkyl group such as chloromethyl group, 3-chloropropyl group, 1-chloro-2-methyl propyl group, and 3,3,3-trifluoropropyl group. Among these, the preferred are methyl group, vinyl group, and phenyl group, and the most preferred is vinyl group having high hydrolytic reactivity.

Examples of the hydrolyzable group bonded to the silicon atom (X in the formula (2)) include alkoxy groups containing 1 to 4 carbon atoms, and in particular 1 or 2 carbon atoms such as methoxy group, ethoxy group, propoxy group, and butoxy group; dialkylketoxime groups such as dimethylketoxime group, methylethylketoxime group, and methylisobutylketoxime group; alkenoxy groups containing 2 to 4 carbon atoms such as isopropenoxy group; and asiloxy groups such as acetoxy group. Preferred is the ketoxime group represented by the following formula (2a):

$$R^2_a Si(O-N=CR^3R^4)_{4-a} \quad (2a)$$

wherein $R^2$ and a are as defined above, $R^3$ and $R^4$ are independently a monovalent saturated hydrocarbon group containing 1 to 6 carbon atoms such as an alkyl group or a cycloalkyl group.

Examples of the component (II) include silanes such as dialkylketoxime silanes such as methyltris(dimethylketoxime)silane, methyltris(methylethylketoxime)silane, ethyltris(methylethylketoxime)silane, methyltris(methylisobutylketoxime)silane, and vinyltris(methylethylketoxime)silane; alkoxysilanes such as methyltrimethoxysilane and vinyltrimethoxysilane; alkenoxysilanes such as methyltriisopropenoxysilane; acetoxysilane such as methyltriacetoxysilane and vinyltriacetoxysilane; and their partial hydrolytic condensates, which may be used alone or in combination of two or more. The preferred are hydrolyzable silanes such as dialkylketoximesilanes and their partial hydrolysate, and in particular, vinyltrismethylethylketoximesilane in view of curability and odor of the thin film.

The component (II) may be incorporated at an amount in the range of 10 to 50 parts by weight, and preferably 15 to 45 parts by weight in relation to 100 parts by weight of the component (I). When the amount is less than 10 parts by weight, sufficient crosslinking and curing is not accomplished and cured composition will not have rubber elasticity, and use of such amount is also associated with the risk of increase of viscosity and gelation with the lapse of time. On the other hand, amount in excess of 50 parts by weight results in the decrease of extension and increase of hardness, and consequently, loss of the mechanical properties.

Component (III)

In the composition of the present invention, solvent (III) is incorporated in addition to the components (I) and (II). The component (III) imparts adequate viscosity to the materials and adjusts workability in the preparation of the gas separation membrane. The solvents suitable for the composition of the present invention are those used in the ordinary condensation-curable organopolysiloxane composition. Exemplary such solvents include saturated hydrocarbons such as pentane, hexane, heptane, octane, isooctane, cyclohexane, methylcyclohexane, and solvent volatile oil; aromatic hydrocarbons such as toluene, xylene, and ethylbenzene; ketones such as methyl ethyl ketone and methyl isobutyl ketone; esters such as ethyl acetate; low molecular weight cyclic siloxanes such as octamethylcyclotetrasiloxane; and isoparaffins. These solvents which may be used alone or as a mixture of two or more.

The component (III) may be incorporated at an amount of 500 to 1,500 parts by weight, and preferably 600 to 1,200 parts by weight in relation to 100 parts by weight of the component (I). When the amount is less than 500 parts by weight, sufficient workability may not be realized while an amount in excess of 1,500 parts by weight may result in the loss of the thickness of the coating, and hence, loss of coating strength.

Component (IV)

The component (IV) in the composition of the present invention is silica nano particles having their surfaces modified by a branch structure, and a gas separation membrane having high gas permeability can be produced by adding the silica nano particles to the matrix resin.

The inorganic silica nano particle used in the present invention may have a nano order particle size (The particle size in the present invention is average particle diameter).

In view of the gas permeability, the particle size is typically about 1 to 100 nm, preferably about 1 to 20 nm, and more preferably about 1 to 10 nm. The particle diameter can be measured, for example, as a cumulative weight average diameter $D_{50}$ (or median diameter) by measuring particular size distribution by laser diffractometry.

The silica nano particle is treated by a silane coupling agent having a functional group which reacts with a hyperbranched monomer or dendrimer-forming monomer so that the reactive functional group is added to the surface of the silica nano particle. In the case when the silane coupling agents is a compound having amino group at its end represented by the following formula (3):

(3)

(wherein $R^5$ represents methyl group or ethyl group, and $R^6$ is an alkylene group containing 1 to 5 carbon atoms and optionally including an intervening —NH— group), and the surface of the silica nano particle is modified with amino group, the amino group is bonded to the silica surface by the silanol group of the silica nano particle and the silane coupling agent.

Examples of the compound represented by the general formula (3) include 3-aminopropyltriethoxysilane and 3-aminopropyltrimethoxysilane. Typical other silane coupling agent having amino group include 3-(2-aminoethylamino)propyltriethoxysilane and 3-(2-aminoethylamino)propyltrimethoxysilane.

A branched structure is added to the thus prepared silica nano particle having the functional group on its surface. An exemplary method for adding a hyperbranched polymer to the thus prepared silica nano particle having its surface modified with amino group is illustrated in the following scheme. In the silica nano particle having the hyperbranched polymer added thereto of the following reaction scheme, —$R^6$—Si(—O—)$_3$ group between the silica and the —NH— group is omitted for the purpose of simplicity. While many amino groups are present on the silica nano particle, only 4 amino groups are shown in the following scheme.

Addition of hyperbranched polymer on the silica nano particle having amino group added on its surface In the embodiment as described above, a compound having 1 carboxyl group and 2 amino groups represented by the following formula (4):

(wherein $R^7$ is a trivalent saturated aliphatic group or an aromatic group) is used as a hyperbranched monomer. However, the hyperbranched monomer may be a compound having 3 or more amino groups and $R^7$ may be a trivalent group other than the trivalent saturated aliphatic or aromatic group. Examples of the hyperbranched monomer represented by the general formula (4) include 3,5-diaminobenzoic acid and 3,5-diamino-4-methylbenzoic acid.

The procedure as described above may be repeated for at least once, preferably several times in step-by-step manner, and more preferably 3 to 5 times for the addition of the hyperbranched monomer to the thus prepared silica nano particle having its surface modified by branch structures to thereby produce a branch-modified silica nano particle which has experienced two or more modification stages (the number of modification stages may also be referred to as generation(s)), and in particular, 3 to 5 modifications generations. Higher number of modification stages (or higher number of generations) is preferable, while difficulty of the synthesis and decrease in the yield is associated with the increased number of modification stages.

The component (IV) is incorporated at an amount in the range of 10 to 150 parts by weight, and preferably 25 to 100 parts by weight in relation to 100 parts by weight of the component (I). When the amount incorporated is less than 10 parts by weight, improvement in the gas permeability will be insufficient while incorporation in excess of 150 parts by weight will result in the loss of strength of the gas separation membrane.

Component (V)

The composition of the present invention may further comprise a condensation catalyst. Exemplary condensation catalysts include organotitanium compound such as tetraisopropoxy titanium, tetrabutoxy titanium, and titanium bisacetylacetonate; strong bases such as tetramethylguanidine and tetramethylguanidylpropyltrimethoxysilane; aminosilane coupling agent such as γ-aminopropyltriethoxysilane; and metal carboxylate salts such as zinc octanoate, lead 2-ethylhexanoate, dibutyltin diacetate, dibutyltin dilactate, dioctyltin dilaurate, stannous octanoate, zinc naphthenate, and ferrous octanoate. In view of the activity and availability of the catalyst, the particularly preferred are aminosilane coupling agents represented by the following formula (5):

wherein $R^8$ is a monovalent hydrocarbon group containing 1 to 6 carbon atoms, $R^9$ is methyl group or ethyl group, b is an integer of 1 to 3, and c is 0 or 1. Exemplary such aminosilane coupling agent is γ-aminopropyltriethoxysilane.

When such condensation catalyst is incorporated, the amount used is not particularly limited as long as it is used at a catalytically effective amount. The condensation catalyst, however, is typically used at an amount of about 0.01 to 10 parts by weight, and preferably about 0.1 to 5 parts by weight in relation to 100 parts by weight of the component (I).

Preparation of the Composition

The composition of the present invention may be produced by uniformly mixing the components (I) to (IV) and other optionally added components.

Application of the Composition

The composition of the present invention provides gas separation membrane with markedly improved gas permeability, gas selectivity, and other functions, and in particular, improved selective permeability of hydrogen from gas mixture, selective permeability of oxygen from air, and selective permeability of carbon dioxide from greenhouse gas, selective permeability of methane from natural gas, and the like because it contains silica nano particles having their surface modified with branched structure providing free volume between branch chains that contributes particularly for the gas permeability.

Based on such properties, the product of the present invention may be applied for selective permeation of hydrogen from mixed gas, oxygen recovery from air, supply of highly concentrated oxygen to combustion system, separation and recovery of greenhouse gas from exhaust from power plant or steel plant, selective permeation of methane from natural gas, recovery of methane from bio gas, and the like.

The method used for producing the membrane of the composition is not particularly limited. Exemplary methods include casting, spin coating, bar coater coating, screen printing, spray coating, dip coating, brush coating, and other method used for ordinary film formation. A hybrid membrane can be produced, for example, by the following procedure.

500 to 1,500 parts by weight of the component (III) is dissolved in 100 parts by weight of the component (I), and 10 to 150 parts by weight of the component (IV) in relation to 100 parts by weight of the component (I) is added to this solution. After 1 hour of ultrasonication, this polymer solution is agitated at an agitation rate of 1,200 rpm for about 12 hours. After adding 10 to 50 parts by weight of the component (II) in relation to 100 parts by weight of the component (I), the solution is cast on a Teflon (Registered Trademark) dish. This Teflon (Registered Trademark) dish is allowed to stand for 3 to 5 days at room temperature to thereby form a hybrid membrane, and the thus obtained hybrid membrane is dried under vacuum, for example, at 50° C. for 15 hours.

The composition may be cured at a standard curing conditions of 23° C. and a relative temperature of 50% for about 7 days, and the cured film can be obtained normally by leaving in the room (for example, at 20° C.±15° C. and a relative temperature of 25 to 80%) for about 2 hours. The cured film can be obtained in about 30 minutes if dried at 120° C. to promote the drying of the solvent.

Thickness of the gas separation membrane formed may vary depending on the intended use. However, in the case of the separation and recovery of the greenhouse gas, it has been known that a flow rate of the carbon dioxide through the membrane of $10^5$ (GPU) is necessary when carbon dioxide at a concentration of 60% is concentrated to a concentration of 99% in two stages. In the current performance, limitation of the gas separation membrane thickness to the range of 1 μm or less is necessary for realizing such flow rate.

EXAMPLES

Next, the present invention is described in further detail by referring to Synthetic Examples, Examples, and Comparative Examples, which by no means limit the scope of the present invention. The degree of polymerization and molecular weight are weight average (weight average degree of polymerization, weight average molecular weight) in terms of polystyrene determined by GPC analysis (solvent: toluene).

Synthetic Example 1

Preparation of Uncrosslinked Polydimethylsiloxane (Component (I))

A four necked separable flask equipped with a thermometer, a stirrer, and a reflux condenser was charged with 1,167 g of toluene solution (with a solid content of 60% by weight) of organopolysiloxane (with the molecular weight of about 3,200) having three dimensional network structure, comprising $(CH_3)_3SiO_{1/2}$ unit and $SiO_{4/2}$ unit with the $(CH_3)_3SiO_{1/2}$ unit/$SiO_{4/2}$ unit (molar ratio) of 0.75, and content of hydroxy group bonded to the silicon atom of 0.10 mol/100 g as component (A) and 300 g of a straight chain dimethylpolysiloxane having opposite ends capped with silanol group having a degree of polymerization of about 8,000 (with the molecular weight of about 600,000) as component (B), and after stirring the mixture to uniformity, 5.0 g of ammonia solution was added to allow the condensation to proceed at 20° C. for 12 hours. Next, ester trap tube was mounted on the separable flask, azeotropic dehydration was conducted at 120° C. to remove ammonia, water, and toluene. A toluene solution of the condensation product of the component (A) and the component (B) with colorless and transparent appearance having an involatile content of 80% (after drying at 105° C. for 3 hours) was produced. 120 g of toluene was added to the 200 g of the resulting solution to adjust the involatile content to 50% by weight, and this was used as the uncrosslinked polydimethylsiloxane of the component (I).

Synthetic Example 2

Synthesis of Colloidal Silica Having its Surface Modified with 3-aminopropyltriethoxysilane (APTES)

4.5 g of colloidal silica (particle size, 15 nm), 150 ml of toluene, 12.6 ml of 3-aminopropyltriethoxysilane (APTES) were added to a three necked flask, and the mixture was refluxed at 80° C. for 24 hours. The reaction solution was centrifuged at 5,000 rpm for 1 hour, and after discarding the supernatant, the particles were washed several times with toluene to remove unreacted APTES and obtain particles having its surface modified with APTES. The particles having the APTES-modified surface was dried in vacuum at 80° C. for 15 hours.

Synthetic Example 3

Synthesis of Colloidal Silica Having its Surface Modified with Hyperbranched Structure Scheme 2: Addition of hyperbranched structure to APTES-added colloidal silica Silica nano particles having its surface modified with APTES 3,5-diaminobenzoic acid Silica nano particles having its surface modified with hyperbranched structure The APTES-modified colloidal silica produced in Synthetic Example 2 was dried at 70° C. for 12 hours before its use. 1.2 g of this particle (with the weight formulation measured by TGA of 1.122 g of silica and 0.078 g of APTES) was weighed and charged in a three necked flask preliminarily purged with nitrogen, and after adding 5.9 ml of purified NMP and agitating the mixture at 1,200 rpm for 30 minutes, the mixture was ultrasonicated for 30 minutes. To this mixture, 0.489 g of diphenyl (2,3-dihydro-2-thioxo-3-benzoox-azolyl)-phosphonate (the catalyst) having 0.16 ml of triethylamine preliminarily added thereto was added, and the mixture was stirred until the catalyst completely dissolved. Then, 0.301 g of 3,5-diaminobenzoic acid was added to this reaction solution and the mixture was stirred at room temperature for 48 hours. The surface-modified particle at this stage is referred to as the colloidal silica surface modified with hyperbranched structure 1 (generation 1).

After stirring for 48 hours, 2.3 ml of purified NMP was added to the reaction solution, and 1.091 g of diphenyl (2,3-dihydro-2-thioxo-3-benzooxazolyl)phosphonate (the catalyst) having 0.33 ml of triethylamine preliminarily added thereto was added, and the mixture was stirred until the catalyst completely dissolved. Then, 0.602 g of 3,5-diaminobenzoic acid was added to this reaction solution and the mixture was stirred at room temperature for 48 hours. The surface-modified particle at this stage is referred to as the colloidal silica surface modified with hyperbranched structure 2 (generation 2).

After 48 hours, 4.7 ml of purified NMP was added to the reaction solution, and 2.183 g of diphenyl (2,3-dihydro-2-thioxo-3-benzooxazolyl)phosphonate (the catalyst) having 0.66 ml of triethylamine preliminarily added thereto was added, and the mixture was stirred until the catalyst completely dissolved. Then, 1.203 g of 3,5-diaminobenzoic acid was added to this reaction solution and the mixture was stirred at room temperature for 48 hours. The surface-modified particle at this stage is referred to as the colloidal silica surface modified with hyperbranched structure 3 (generation 3).

To remove the catalyst (diphenyl (2,3-dihydro-2-thixo-3-benzooxazolyl)phosphonate) and the unreacted and polymerized 3,5-diaminobenzoic acid from the reaction solution, the particles were washed by repeating several cycles of precipitation of the target compound by centrifugation, discarding of the supernatant, and addition of the NMP. The colloidal silica surface modified with hyperbranched structure was thereby obtained. The particles were recovered also by centrifugation, and the recovered particles were dried under vacuum at 120° C. for 15 hours.

Synthetic Example 4

Synthesis of Colloidal Silica Having its Surface Modified with 3-aminopropyltriethoxysilane (APTES)

A three necked flask was charged with 1.5 g of colloidal silica (particle size, 10 nm), 500 ml of 2,2,4-trimethylpentane, and 1.58 ml of 3-aminopropyltriethoxysilane (APTES), and the mixture was stirred at room temperature for 24 hours.

Synthetic Example 5

Synthesis of Colloidal Silica Having its Surface Treated with Hyperbranched Structure 200 ml of tetrahydrofuran (THF), 1.883 g of diphenyl (2,3-dihydro-2-thioxo-3-benzooxazolyl)phosphonate (the catalyst), and 0.56 ml of triethylamine were added to the reaction solution prepared in Synthetic Example 4, and the mixture was stirred until the catalyst was completely dissolved. Then, 1.026 g of 3,5-diaminobenzoic acid was added to the reaction solution, and the mixture was stirred at room temperature for 48 hours. The surface-modified particle at this stage is referred to as the colloidal silica surface modified with hyperbranched structure 4 (generation 1).

After stirring for 48 hours, 2.217 g of diphenyl (2,3-dihydro-2-thioxo-3-benzooxazolyl)phosphonate (the catalyst) having 0.33 ml of triethylamine preliminarily added thereto was added, and the mixture was stirred until the catalyst completely dissolved. Then, 1.22 g of 3,5-diaminobenzoic acid was added to this reaction solution and the mixture was stirred at room temperature for 48 hours. The surface-modified particle at this stage is referred to as the colloidal silica surface modified with hyperbranched structure 5 (generation 2).

After stirring for 48 hours, 4.435 g of diphenyl (2,3-dihydro-2-thioxo-3-benzooxazolyl)phosphonate (the catalyst) having 1.34 ml of triethylamine preliminarily added thereto was added, and the mixture was stirred until the catalyst completely dissolved. Then, 2.444 g of 3,5-diaminobenzoic acid was added to this reaction solution and the mixture was stirred at room temperature for 48 hours. The surface-modified particle at this stage is referred to as the colloidal silica surface modified with hyperbranched structure 6 (generation 3).

To remove the catalyst (diphenyl (2,3-dihydro-2-thixo-3-benzooxazolyl)phosphonate) and the unreacted and polymerized 3,5-diaminobenzoic acid from the reaction solution, the particles were washed by repeating several cycles of precipitation of the target compound by centrifugation, discarding of the supernatant, and addition of the NMP. The colloidal silica surface modified with hyperbranched structure was thereby obtained. The particles were recovered also accomplished by centrifugation, and the recovered particles were dried under vacuum at 120° C. for 15 hours.

[FT-IR Measurement of Colloidal Silica Surface Modified with Hyperbranched Structure]

Figure 1:
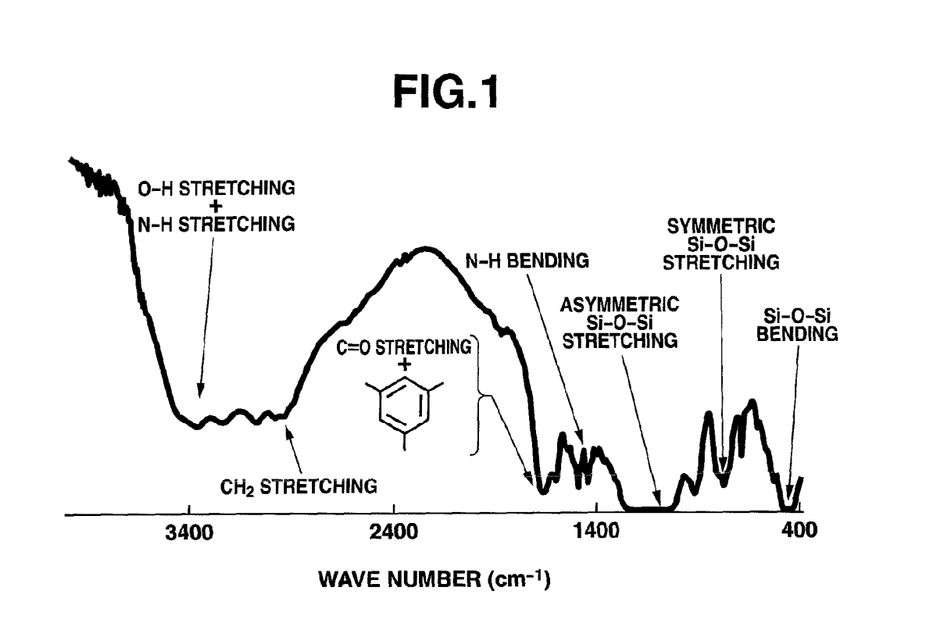
FIG. 1 is a view showing the results of FT-IR measurement of colloidal silica having its surface modified with hyperbranched structure 6 (generation 3) prepared in Synthetic Example 5.
Figure 2:
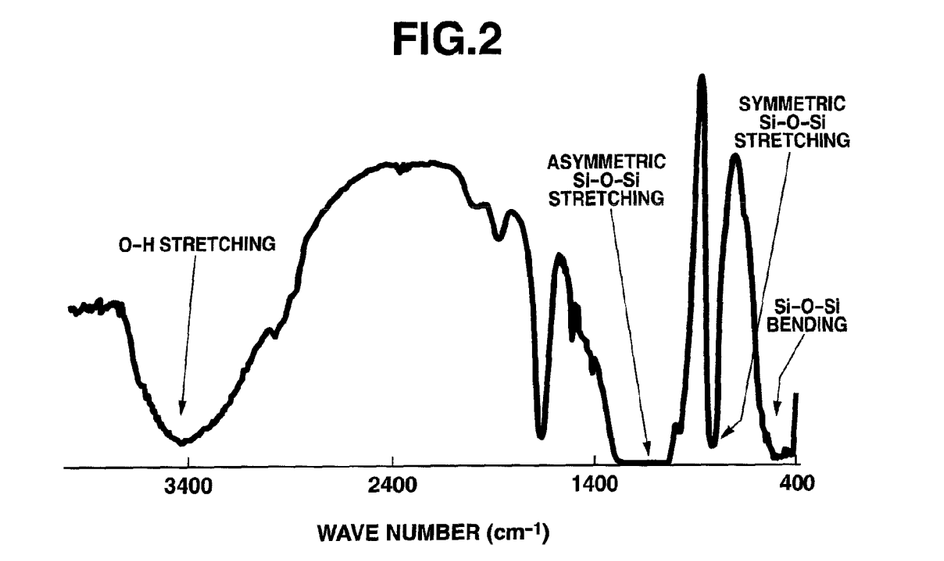
FIG. 2 is a view showing the results of FT-IR measurement of surface-unmodified colloidal silica.

The results of the FT-IR measurement of the thus prepared colloidal silica surface modified with hyperbranched structure 6 (generation 3) are shown in FIG. 1, and the results of the FT-IR measurement of the surface-unmodified colloidal silica are shown in FIG. 2 for the purpose of comparison. In FIG. 1, the peaks believed to be from the tri-substituted benzene of the 3,5-diaminobenzoic acid could be confirmed near 1,600 $cm^{-1}$ and 1,500 $cm^{-1}$, and the peaks from the amide bond between the APTES and the 3,5-diaminobenzoic acid could be confirmed near 3,400 $cm^{-1}$ an 1,500 $cm^{-1}$. These results indicate progress of the addition of the 3,5-diaminobenzoic acid to the particles having the surface modified with APTES.

Example 1

Preparation of Organic-Inorganic Hybrid Gas Separation Membrane Using Polydimethylsiloxane and the Colloidal Silica Having its Surface Modified with Hyperbranched Structure 1.5 g of uncrosslinked polydimethylsiloxane produced in Synthetic Example 1 was dissolved in 6.921 ml of toluene, and the colloidal silica surface modified with hyperbranched structure 6 (generation 3) produced in Synthetic Example 5 was added to the polymer solution so that content to the polymer was 20% by weight. After 1 hour of ultrasonication, the polymer solution was agitated overnight at an agitation rate of 1,200 rpm, and after adding a 10:1 mixture (weight ratio) of 0.25 g of vinyltrismethylethylketoximesilane (crosslinking agent) and γ-aminopropyltriethoxysilane, the mixture was cast on a Teflon (Registered Trademark) dish. The Teflon (Registered Trademark) dish was allowed to stand at room temperature for several days to produce the hybrid membrane. The resulting hybrid membrane was dried under vacuum at 50° C. for 15 hours. The resulting membrane had a thickness of 500 μm.

[Gas Permeation Property of the Gas Separation Membrane Comprising the Hybrid of Polydimethylsiloxane/Colloidal Silica Having its Surface Modified with Hyperbranched Structure]

The gas permeation of the thus obtained hybrid membrane was measured by using K-315N-01C manufactured by Rikaseiki-kogyo Co. Ltd. at a temperature of 35° C. and a pressure of 76 cmHg. The measurement was conducted by supplying oxygen, nitrogen, and carbon dioxide for the gas. The results are shown in Table 1.

Example 2

Preparation of Organic-Inorganic Hybrid Gas Separation Membrane Using Polydimethylsiloxane and the Colloidal Silica Having its Surface Modified with Hyperbranched Structure The procedure of Example 1 was repeated by using the colloidal silica having its surface modified with hyperbranched structure 4 (generation 1) obtained in Synthetic Example 5 for the colloidal silica having its surface modified with hyperbranched structure added to prepare an organic-inorganic hybrid gas separation membrane. Gas permeation of the resulting hybrid membrane was measured by repeating the procedure of Example 1. The results are shown in Table 1.

Comparative Example 1

Preparation of Polydimethylsiloxane Gas Separation Membrane

The procedure of Example 1 was repeated by adding the colloidal silica having its surface modified with hyperbranched structure at 0% by weight, namely without using the colloidal silica having its surface modified with hyperbranched structure to prepare a polydimethylsiloxane gas separation membrane. Gas permeation of the resulting hybrid membrane was measured by repeating the procedure of Example 1. The results are shown in Table 1.

TABLE 1

Gas permeation properties of the hybrid membrane of polydimethylsiloxane-colloidal silica having its surface modified with hyperbranched structure

| | Type of the particles | $PN_2$ | $PO_2$ | $PCO_2$ |
|---|---|---|---|---|
| Example 1 | Colloidal silica having its surface modified with hyperbranched structure 6 (generation 3) | 644 | 1,440 | 6,350 |
| Example 2 | Colloidal silica having its surface modified with hyperbranched structure 4 (generation 1) | 414 | 998 | 5,080 |
| Comparative Example 1 | No particles | 244 | 601 | 2,691 |

*P: Barrer = $1 \times 10^{-10}$ (cm$^3$(STP)cm/cm$^2$ · sec · cmHg)

As evident from Table 1, gas permeation coefficient of the hybrid membrane increased with the increase in the generation of the colloidal silica having its surface modified with hyperbranched structure, and the gas permeation coefficient at its maximum was about twice the value when the particle was not added.

Japanese Patent Application No. 2011-094690 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature curable organopolysiloxane composition comprising (I) 100 parts by weight of an organopolysiloxane which is a condensation product of 80 to 20 parts by weight of the following component (A) and 20 to 80 parts by weight of the following component (B) (with the proviso that total of the components (A) and (B) are 100 parts by weight):

(A) an organopolysiloxane comprising $R_3SiO_{1/2}$ unit (wherein R independently represents a substituted or unsubstituted monovalent hydrocarbon group containing 1 to 6 carbon atoms) and $SiO_{4/2}$ unit, with the $R_3SiO_{1/2}$ unit being present at 0.6 to 1.2 mol per mole of the $SiO_{4/2}$ unit; optionally further comprising $R_2SiO_{2/2}$ unit and $RSiO_{3/2}$ unit (wherein R is as defined above) respectively at 0 to 1.0 mol per mole of the $SiO_{4/2}$ unit, and containing 0.02 to 0.12 mol/100 g of hydroxy group bonded to the silicon atom, and (B) a diorganopolysiloxane raw rubber having hydroxy group on opposite ends thereof and having a degree of polymerization of at least 5,000, (II) 10 to 50 parts by weight of an organosilane compound having at least 2 hydrolyzable groups bonded to the silicon atom on average per molecule, and/or its partial hydrolytic condensate, (III) 500 to 1,500 parts by weight of a solvent, and (IV) 10 to 150 parts by weight of silica nano particles having their surface modified by a branch structure.

2. A composition according to claim 1 wherein the component (B) is a straight chain diorganopolysiloxane represented by the following formula (1):

$$HO\text{—}(R^1{}_2SiO)_n\text{—}H \quad (1)$$

wherein $R^1$ is independently a substituted or unsubstituted monovalent hydrocarbon group containing 1 to 10 carbon atoms and n is an integer of at least 5,000.

3. A composition according to claim 1 wherein the component (II) is an organosilane compound having 2 hydrolyzable groups bonded to the silicon atom on average per molecule represented by the following formula (2):

$$R^2{}_a SiX_{4-a} \quad (2)$$

wherein $R^2$ is a substituted or unsubstituted monovalent hydrocarbon group, x is a hydrolyzable group, and a is 0, 1, or 2, and/or its partial hydrolytic condensate.

4. A composition according to claim 3 wherein $R^2$ in the component (II) is vinyl group.

5. A composition according to claim 1 wherein the component (IV) is the one produced by treating surface of a silica nano particle with a compound having amino group at its end and represented by the following formula (3):

(3)

(wherein R⁵ represents methyl group or ethyl group, R⁶ represents an alkylene group containing 1 to 5 carbon atoms and optionally having an intervening —NH— group) to modify the silica nano particle surface with the amino group, and then reacting a hyperbranched monomer represented by the following formula (4):

(4)

(wherein R⁷ represents a trivalent saturated aliphatic group or an aromatic group) with the amino group-modified silica nano particles.

6. A composition according to claim 1 further comprising (V) 0.1 to 5 parts by weight of a condensation catalyst.

7. A composition according to claim 6 wherein the condensation catalyst (V) is an aminosilane coupling agent represented by the following formula (5):

(5)

wherein $R^8$ is a monovalent hydrocarbon group containing 1 to 6 carbon atoms, $R^9$ is methyl group or ethyl group, b is an integer of 1 to 3, and c is 0 or 1.

8. A gas separation membrane produced by curing the composition of claim 1.

\* \* \* \* \*